UNITED STATES PATENT OFFICE.

FELIX HERWIG, OF ELBERFELD, GERMANY, ASSIGNOR TO THE FARBENFABRIKEN OF ELBERFELD CO., OF NEW YORK, N. Y.

DISAZO DYE AND PROCESS OF MAKING SAME.

SPECIFICATION forming part of Letters Patent No. 673,079, dated April 30, 1901.

Application filed August 1, 1900. Serial No. 25,571. (No specimens.)

*To all whom it may concern:*

Be it known that I, FELIX HERWIG, doctor of philosophy, chemist, (assignor to the FARBENFABRIKEN OF ELBERFELD CO., of New
York,) residing at Elberfeld, Germany, have invented a new and useful Improvement in Disazo Dyes; and I hereby declare the following to be a clear and exact description of my invention.
My invention relates to the production of new secondary disazo dyestuffs having the general formula

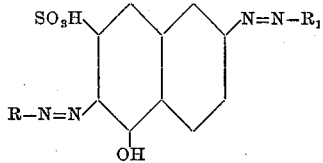

R meaning in this formula the radical of a diazotized aromatic amin—such as diazobenzene, diazonaphthalene, or the like—$R_1$ meaning the radical of an amidonaphtholsulfonic acid, such as $beta_1$-amido-$alpha_3$-naphthol-$beta_4$-sulfonic acid or the like.

The process for producing the new disazo dyestuffs consists in first combining a diazo derivative of an aromatic amin with $beta_1$-amido-$alpha_3$-naphthol-$beta_4$-sulfonic acid in an alkaline solution; secondly, diazotizing the resulting amidoazo compound, and, finally, coupling the diazoazo compound thus obtained with an amidonaphtholsulfonic acid, or in first diazotizing the $beta_1$-amido-$alpha_3$-
naphthol-$beta_4$-sulfonic acid; secondly, coupling the resulting diazo compound with an amidonaphtholsulfonic acid, and, finally, combining the resulting monoazo dyestuff in an alkaline solution with a diazotized aromatic amin.

The new dyestuffs producible in the above-defined manner are dark powders soluble in water with from violet to bluish-black color. They dye unmordanted cotton from bluish-red to bluish-black shades, which are distinguished by a remarkable fastness to light.

In carrying out my new process practically I can proceed as follows, the parts being by weight: 9.3 parts of anilin are diazotized in the usual manner with the aid of 37.8 parts of hydrochloric acid (15° Baumé) and seven parts of sodium nitrite. The resulting diazo solution is stirred into a solution prepared from 23.9 parts of $beta_1$-amido-$alpha_3$-naphthol-$beta_4$-sulfonic acid and from 26.5 parts of sodium carbonate, ($Na_2CO_3$,) which solution has been cooled down to about zero. After the formation of the monoazo dyestuff which is thus prepared has been finished the mixture is heated under the addition of a suitable quantity of water until it has transformed into a clear liquid. This liquid is cooled down to about 15° centigrade and mixed with an aqueous solution of seven parts of sodium nitrite. The mixture thus obtained is then acidulated by means of one hundred parts of hydrochloric acid (15° Baumé) and stirred for some hours. Subsequently the diazoazo compound thus produced is slowly introduced at about zero into a solution which has been prepared by dissolving 23.9 parts of $beta_1$-amido-$alpha_3$-naphthol-$beta_4$-sulfonic acid and 40.5 parts of sodium carbonate ($Na_2CO_3$) in eight hundred parts of water. After the combination has been finished the reaction mixture is heated to about 80° centigrade and the disazo dyestuff thus produced is separated in the usual manner by the addition of common salt, filtered off, dried, and pulverized. It is the sodium salt of an acid having the formula

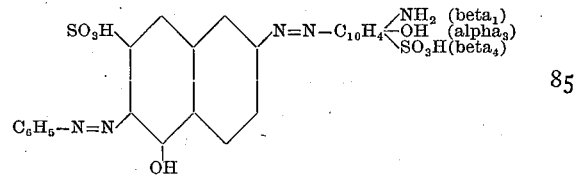

and is a dark powder having a metallic luster soluble in water with a violet color which changes into a bluish-violet color on the addition of sodium carbonate, being also soluble in ammonia with a violet color. It is but scarcely soluble in hot hydrochloric acid (19° Baumé) with a reddish color and is dissolved by concentrated sulfuric acid (66° Baumé) with a blue color which is changed into violet on the addition of a small quantity of ice, while a brownish-red precipitate is obtained on the addition of a larger quantity of ice to the sulfuric-acid solution.

The new coloring-matter dyes unmordanted cotton bluish-red shades which are distinguished by a remarkable fastness to acids and to light.

Having now described my invention and in what manner the same is to be performed, what I claim as new, and desire to secure by Letters Patent, is—

1. The process for producing new disazo dyestuffs which process consists in first combining one molecule of a diazotized aromatic amin with one molecule of beta$_1$-amido-alpha$_3$-naphthol-beta$_4$-sulfonic acid, secondly rediazotizing the resulting amidoazo compound and finally coupling the diazoazo compound thus obtained with an amidonaphthol sulfonic acid, substantially as hereinbefore described.

2. The process for producing a new disazo dyestuff which process consists in first combining a diazo derivative of anilin with one molecule of beta$_1$-amido-alpha$_3$-naphthol-beta$_4$-sulfonic acid, secondly rediazotizing the resulting amidoazo compound and finally coupling the diazoazo compound thus produced with a second molecule of beta$_1$-amido-alpha$_3$-naphthol-beta$_4$-sulfonic acid, substantially as hereinbefore described.

3. The herein-described new disazo dyestuffs which are alkaline salts of acids having the general formula:

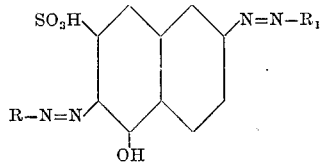

R—N=N— representing in this formula the radical of a diazotized aromatic amin R$_1$ meaning the radical of an amidonaphtholsulfonic acid, and which are dark powders soluble in water with from violet to bluish-black color, dyeing unmordanted cotton from bluish-red to bluish-black shades which are distinguished by a remarkable fastness to light, substantially as hereinbefore described.

4. The herein-described disazo dyestuff being an alkaline salt of an acid having the formula:

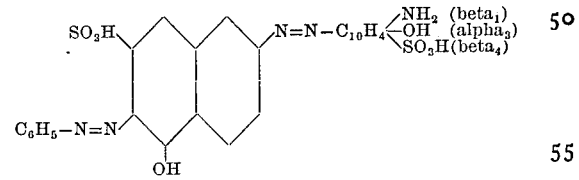

which in the form of the sodium salt is a dark powder having a metallic luster soluble in water with a violet color, which changes into bluish-violet on the addition of sodium carbonate, being also soluble in ammonia with violet color; but scarcely soluble in hot hydrochloric acid (19° Baumé) with a reddish color, being dissolved by concentrated sulfuric acid (66° Baumé) with a blue color which is changed into violet on the addition of a small quantity of ice, while a brownish-red precipitate is obtained on adding a larger quantity of ice to the sulfuric-acid solution, dyeing unmordanted cotton bluish-red shades which are distinguished by a remarkable fastness to acids and to light, substantially as hereinbefore described.

In testimony whereof I have signed my name in the presence of two subscribing witnesses.

FELIX HERWIG.

Witnesses:
EDUARD FERTIG,
J. A. RITTERSHAUS.